Patented Feb. 24, 1925.

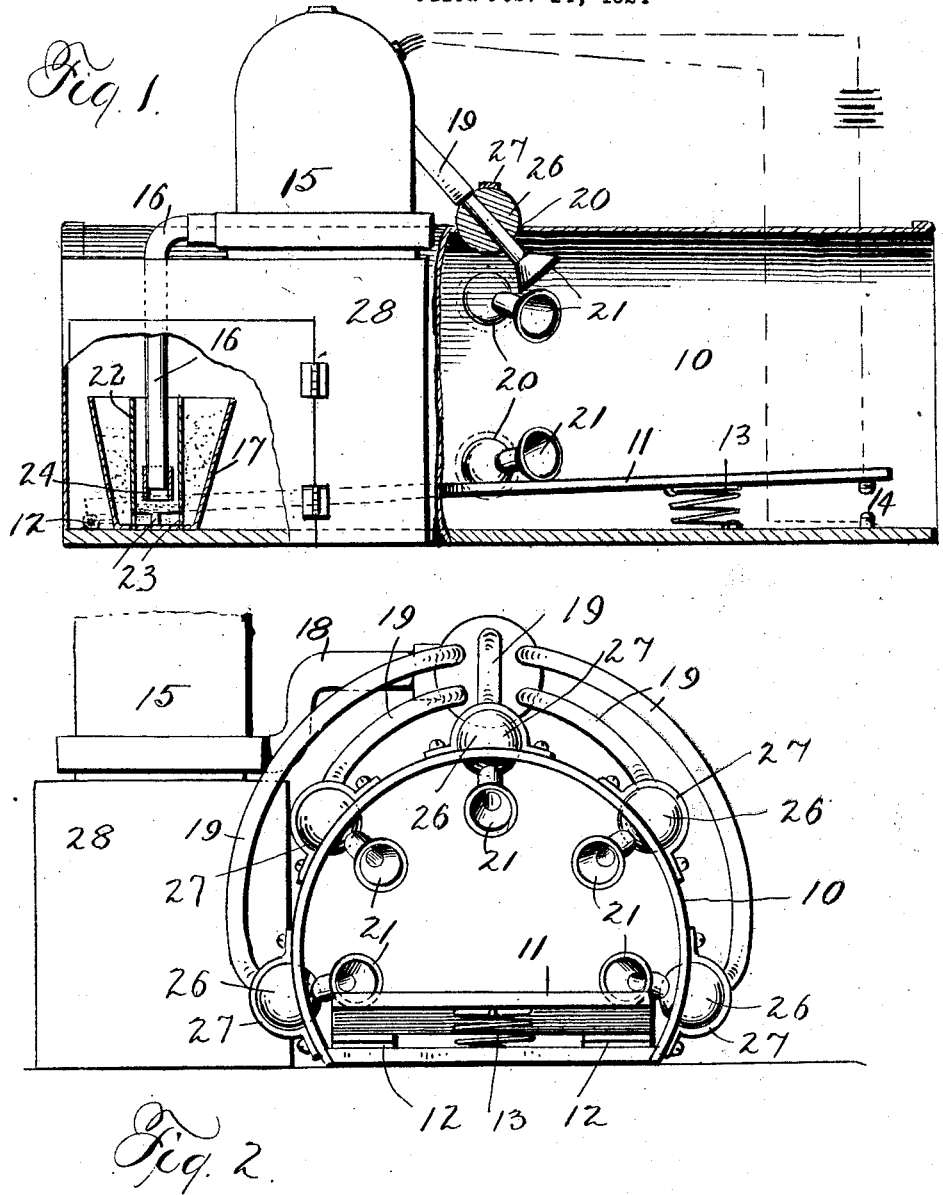

1,527,611

UNITED STATES PATENT OFFICE.

ORA O. SNIDER AND THOMAS F. RIGG, OF FORT WAYNE, INDIANA.

POULTRY-DUSTING DEVICE.

Application filed February 14, 1924. Serial No. 692,797.

*To all whom it may concern:*

Be it known that we, ORA O. SNIDER and THOMAS F. RIGG, residing at Fort Wayne, Indiana, citizens of the United States, have invented certain new and useful Improvements in Poultry-Dusting Devices, of which the following is a specification.

The ravages of chicken lice or vermin are of incalculable financial loss to those in the poultry business, both as affecting the egg laying ability of the hens, and in the death of the chickens affected, which often are fowls of such breed as to be of great value. Although many devices have been proposed for automatically applying an insecticide to chickens, we know of none that has ever been a practical success, and as far as our knowledge goes (and we are poultry raisers of many years' experience) no mechanical device is in use for the purpose, and today the only method of attempting to deal with this great evil, is the hand application of the powder to the individual chickens, which is slow, and otherwise costly, and unsatisfactory for other reasons. The object of our invention is to provide an automatically acting apparatus, which, without being costly to install and maintain will certainly, thoroughly, and therefore, efficaciously apply a powder-form insecticide to chickens, and to this end our invention consists in whatever is described by or is included within the terms or scope of the appended claims.

In the drawings we illustrate a tested and satisfactory embodiment of our invention, but without intending to restrict ourselves thereto, beyond the requirements of the legal meaning of the claims. In such drawings:

Fig. 1 is a view partly in side elevation and partly in section of such apparatus;

Fig. 2 is an end elevation looking at the exit end of the tunnel.

Briefly described, our invention comprises a tunnel, or enclosed passageway, situated at some place through which the chickens must pass, as for example, in some opening into and out of the poultry house, and a motor driven blower, or pneumatic device which will serve the double purpose of blowing up the feathers of the fowl and simultaneously carrying the powder insecticide from a holder and delivering it through the ruffled up or raised feathers to the flesh of the fowl where the parasites are located, the fowl itself placing the blower in operation, as by walking upon a pivoted platform in the tunnel, and such operation continuing so long as the fowl is upon said platform, but the force for operating the blower does not depend upon or is derived from the fowl but by a suitably driven motor, such as an electric motor so that the force with which the feathers are ruffled up and with which the powder is delivered to the body of the fowl, depends not at all upon the weight of the fowl, but upon the independent energy by which the motor is operated, this being an essential feature of our invention and a feature that is vital to the successful mechanical treatment of the fowls.

Referring now in detail to what is shown in the drawings, the tunnel, 10, may be a length of pipe of galvanized iron, with a flat bottom so that it rests in a stable manner on the ground, and better to accommodate a platform, 11, that extends lengthwise through it, which by a horizontal pivot, 12, is hinged so that it may swing vertically and which by a spring, 13, is yieldingly held in an upwardly inclined position, until a fowl walks upon it when it descends under the fowl's weight and closes a switch, 14, in a circuit that includes an electric motor of a fan or blower, 15, the circuit remaining closed as long as the fowl is on the platform, and the blower being operated all that time. From the blower an induction pipe, 16, runs to a reservoir or receptacle, 17, for the powder-form insecticide, and from the blower the powder passes to an eduction pipe, 18, which has several branches, 19, that respectively, lead to openings, 20, distributed around the tunnel, so as to direct streams of powder-charged air in numerous radial streams directed to the fowl all around the body as the fowl reaches these inflowing streams in the tunnel. Each outlet within the tunnel is in the form of a nozzle, 21, that is directed towards the tunnel exit so that the currents of air and powder are projected under the free edges of the feathers as they are thus blown outward from the body of the fowl.

The powder reservoir, 17, may as shown be a cup-like vessel within which are two concentric tubes vertically arranged at the center, the inner one, 22, of which is the induction pipe, 16, an air space being provided between the said tube and the outer tube, the powder entering from the cup through an opening at the bottom of the outer tube, and such powder and the air are then drawn into the induction pipe and thence pass through the blower to the tunnel. The opening at the bottom of the outer tube, 22, is formed by supporting the bottom of the tube above the bottom of the receptacle as by several legs, 23. To regulate the quantity of powder entering the inner tube, 16, a sleeve, 24 is slidably mounted upon its lower end which by being raised or lowered with reference to the powder within the outer tube 23, diminishes or increases the quantity of powder drawn by the air passing down the outer tube, 22, and over or through the powder and into the lower end of the inner tube, 16. To get access to the sleeve, 24, for adjustment the tube, 16, may be lifted out of the receptacle or reservoir, 17.

To provide for adjustment of the nozzles, 21, at the proper angle, each may as shown in the drawings be mounted upon a ball, 26, seated in a hole or opening, 20, in the wall of the tunnel of less diameter than the ball so that the portion of the ball of greatest diameter is on the outside of the tunnel. By loosening a clip, 27, extending over the exterior of the ball, the latter may be turned to vary the angle of the nozzle, 21, and the clip is then tightened to hold the nozzle at the desired adjustment. The eduction pipe branches are flexible to permit this adjustment.

The internal construction of the electric motor blower, 15, is not shown as the same shows no part of the invention. We have used such a motor blower as is used in vacuum sweepers. The motor blower may rest upon the top of a box or casing, 28, which forms an enclosure for the powder receptacle or reservoir and which in its side has a door for giving access to the interior thereof.

What we claim is:

1. Apparatus for dusting poultry comprising a passageway for poultry, a source of supply of powder, means for transfer of powder from such source of supply to the passage comprising a power actuated air moving device, a source of energy for operating said device and means operated by a fowl within the passage for controlling the operation of said power device.

2. Apparatus for dusting poultry comprising a passage for the poultry, a source of supply of powder, means for transferring powder from the source of supply to the passage including a motor operated blower, a source of energy for operating said blower, and means for controlling the supply of energy to the motor actuated by the poultry while in the passage.

3. Apparatus for dusting poultry comprising a passage through which poultry passes, a source of supply of powder exterior to the passage, a motor driven blower having an induction passage leading from the source of powder supply and an eduction passage terminating in a plurality of outlets communicating with the passage at separated points around the same, a source of energy for operating the blower, a vertically movable platform within the passage upon which the poultry must walk in going through the passage and means actuated by said platform to control the supply of energy to the motor.

4. Apparatus for applying insecticide to poultry comprising a source of supply of insecticide, a passage-way for poultry, means for transferring insecticide from the source of supply to the passage comprising a power-actuated insecticide moving device, a source of energy for operating said device, and means operated by a fowl within the passage for controlling the operation of said power device.

5. The combination of a tunnel open from end to end and forming a passageway for poultry, a vertically movable platform at the bottom of said tunnel upon which fowls to be treated walk when passing through the tunnel, an insecticide container, a casing for the latter at the side of the tunnel, a motor blower mounted on said casing having an induction pipe extending into the casing and an eduction pipe extending into the tunnel and means controlled by vertical movement of the platform for starting and stopping the motor blower.

In testimony whereof we hereunto affix our signatures.

ORA O. SNIDER.
THOMAS F. RIGG.